Jan. 4, 1955 J. MACEWKA 2,698,603
HYDRAULIC CYLINDER
Filed Sept. 3, 1949 2 Sheets-Sheet 2
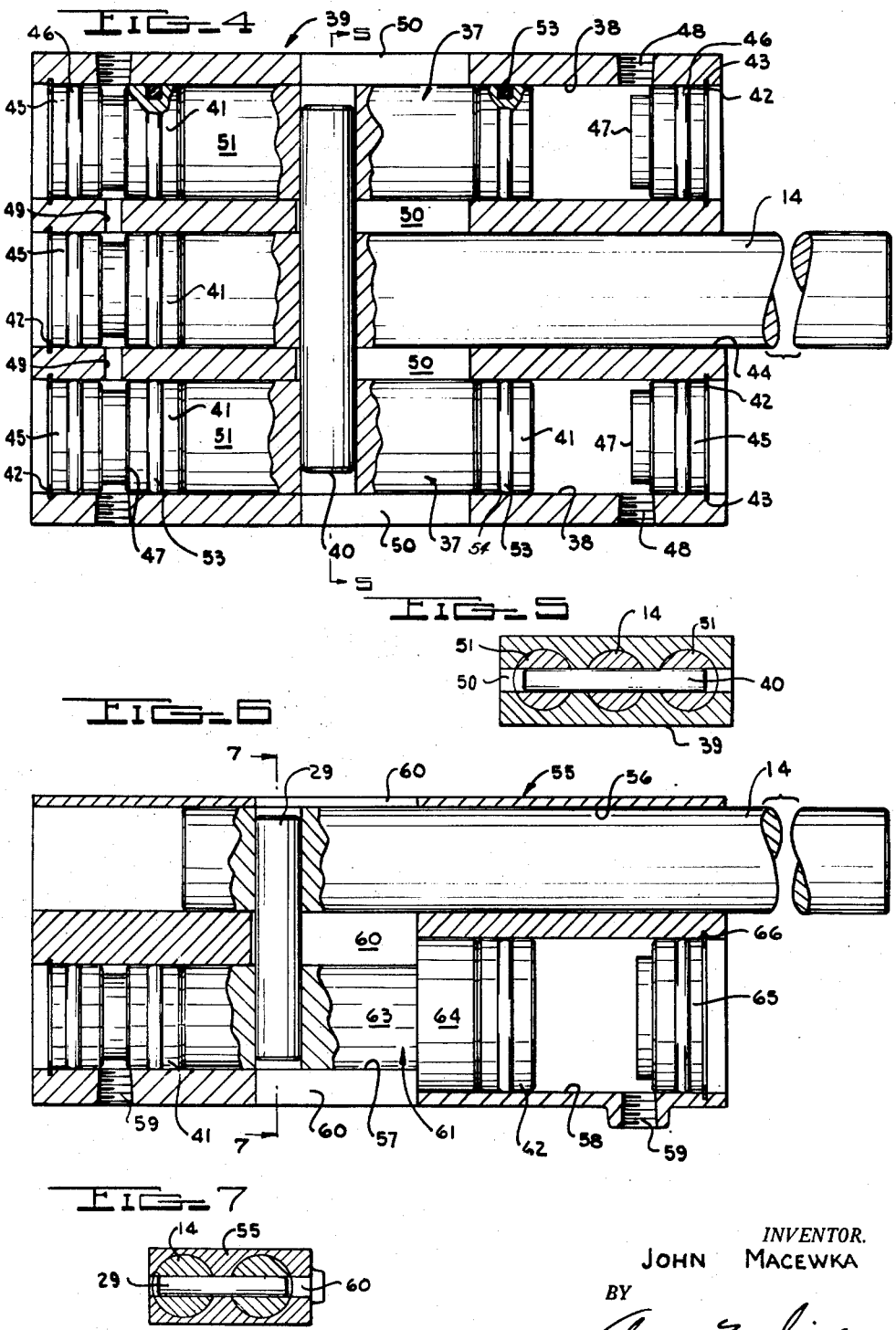
INVENTOR.
JOHN MACEWKA
BY
*Arthur M. Smith*
ATTORNEY United States Patent Office 2,698,603
Patented Jan. 4, 1955

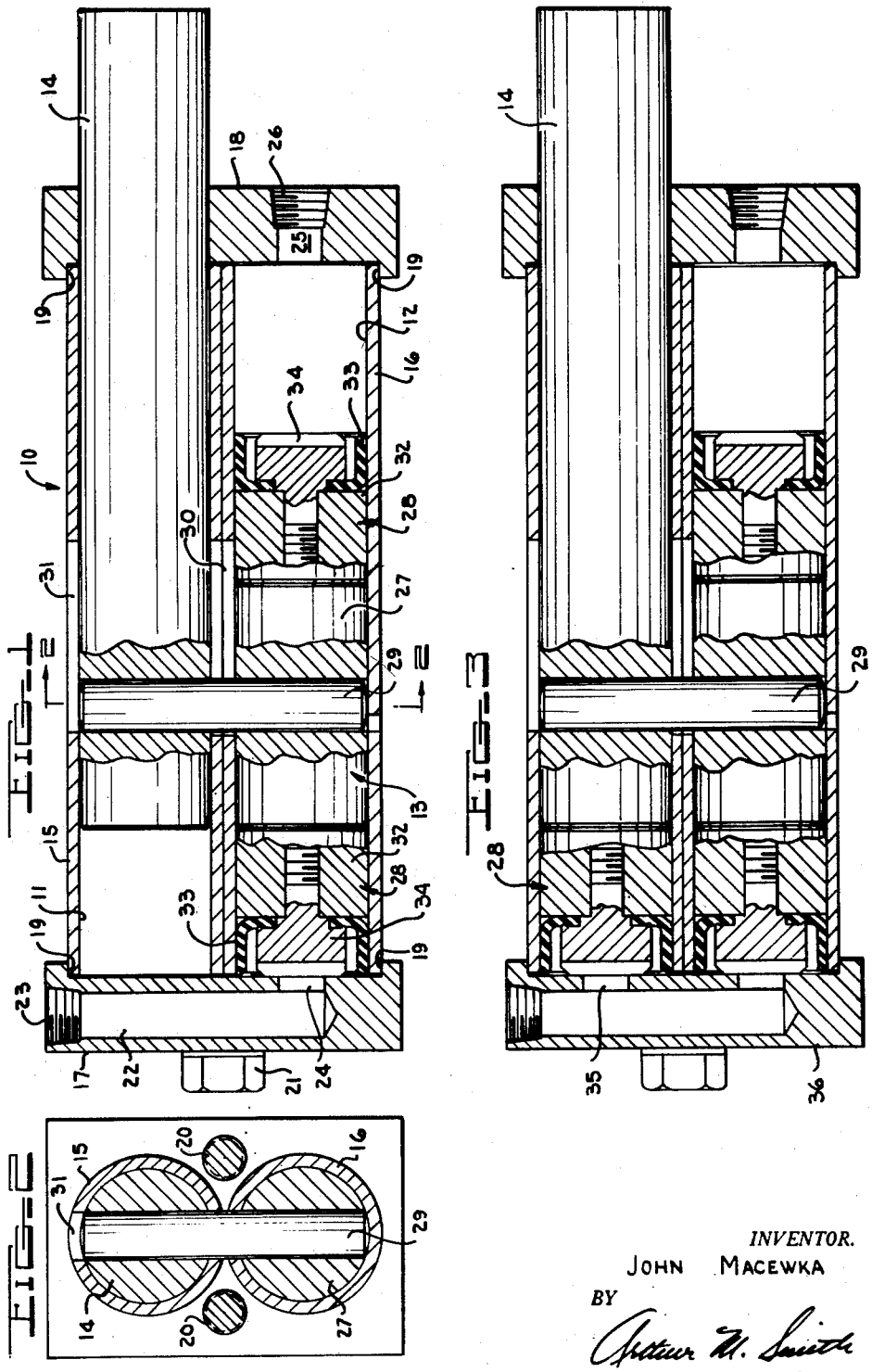

2,698,603

HYDRAULIC CYLINDER

John Macewka, Royal Oak, Mich.

Application September 3, 1949, Serial No. 114,022

4 Claims. (Cl. 121—38)

This invention relates generally to a fluid pressure mechanism and relates more particularly to a double-acting hydraulic cylinder and piston unit.

Double-acting hydraulic units previously employed have been provided with an axial connecting rod secured to the piston. With such construction, the piston has a different displacement in opposite directions of movement and thus, employing a common fluid pressure source, the piston is acted upon at opposite sides by a different total pressure. These prior units, for this reason, have been unsuitable for many purposes.

Also the conventional double-acting hydraulic units have required a fluid pressure seal or packing around the movable connecting rod to seal the pressurized fluid within the cylinder. Considerable difficulty has resulted in maintaining a sufficient seal to prevent excessive fluid leakage, especially after the piston unit has been in use for some time and the seal has been subjected to even slight wear.

In employing double-acting hydraulic units for actuating tools or other mechanism, the connecting rod is frequently subjected to forces tending to cause disalignment of the piston. In the prior hydraulic units, the axial alignment of the piston and connecting rod must be maintained solely by the piston rings or seals and by the packing surrounding the connecting rod. With such devices, very little bearing surface may be provided to maintain alignment. In addition, the packing is generally constructed of rubber or other resilient material and accordingly it cannot maintain an accurate axial alignment of the rod. In the extended position of the piston, the axial support of the piston, is in addition, substantially reduced due to a shortening of the distance between the points of support. This disalignment of the connecting rod, inherent in prior constructions, results in rapid, uneven wear and deformation of the fluid seals and consequently produces excessive fluid leakage.

The prior hydraulic units have the further disadvantage that the connecting rod must be accurately machined and continually maintained in such condition. The exposed surface of the connecting rod is frequently damaged during use, leaving nicks or burrs thereon which score the cylinder and cut and tear the fluid seals, thus necessitating expensive and frequent repair to the connecting rod as well as frequent replacement of the packing.

In employing the hydraulic units with arc welding equipment, the fluid packing or seal of the prior units frequently becomes cut or otherwise damaged due to electrical arcing during the welding operation.

It is accordingly an important object of the present invention to provide a double-acting fluid pressure unit in which the displacement in either direction of the movement of the piston may be easily varied and particularly in which the same displacement may be provided in both directions of movement.

Another object is to provide a piston construction which eliminates the necessity for a packing around the connecting rod and which accordingly may be operated for long periods of time without any appreciable fluid leakage and which is well adapted for use with welding equipment.

Another object of the present invention is to provide a fluid pressure unit in which the connecting rod and piston are rigidly and accurately held in axial alignment, and which provide substantial bearing surface for the connecting rod, even in the fully extended position thereof. Another object is to provide a hydraulic unit of the above type in which the connecting rod and piston are secured against rotation relative to the piston cylinder.

Still another object of the invention is to provide a hydraulic unit in which the total displacement in either direction of movement may be readily and easily varied by varying the number of pistons which are used to move the connecting rod.

Other objects of this invention will appear in the following description and appended claims, reference being had to the accompanying drawings forming a part of this specification wherein like reference characters designate corresponding parts in the several views.

Fig. 1 is a sectional view of a fluid pressure unit embodying the features of the present invention.

Fig. 2 is a sectional view taken substantially on the plane indicated by the lines 2—2 of Fig. 1.

Fig. 3 is a sectional view of a modification of the fluid pressure unit shown in Figs. 1 and 2.

Fig. 4 is a sectional view illustrating another modification of the fluid pressure unit of the present invention and employing a plurality of double-acting pistons.

Fig. 5 is a reduced sectional view taken substantially on the line 5—5 of Fig. 4.

Fig. 6 is a sectional view illustrating another modification of the invention, in which the piston has a different displacement in opposite directions of movement.

Fig. 7 is a reduced sectional view taken substantially on the lines 7—7 of Fig. 6.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the following description of the drawings, corresponding parts will be similarly numbered in the various views and modifications, for purposes of simplicity and clarity.

Referring particularly to the embodiment of the invention as illustrated in Figs. 1 and 2, a fluid pressure unit is shown in its innermost position comprising a housing 10 having a pair of cylinders 11 and 12, a piston 13 slidable in one of the cylinders 12 and a connecting rod 14 slidable in the other cylinder 11 and rigidly connected for movement with the piston 13.

The housing 10 comprises a pair of tubes 15 and 16 and a pair of end plates 17 and 18 positioned at opposite ends of the tubes and held in position by virtue of the recesses 19 in the plates and the two studs 20 and the nuts 21. The end plate 17 is provided with a vertical bore 22 having an internally threaded end portion 23 adapted for connection with a source of fluid under pressure (not shown). A connecting bore 24 is also provided in the end plate 17 which communicates with the open end of the tube 16 to supply fluid under pressure to one end of the cylinder 12. The end plate 18 is provided with a fluid pressure orifice 25 having a threaded end portion 26 for connection with a source of fluid under pressure. The orifice 25 communicates with the opposite end of the cylinder 16 to effect movement of the piston away from the plate 18.

As shown in Fig. 1, the piston 13 comprises a rod 27 and a fluid sealing member 28 positioned at each end of the rod 27 and having surface portions forming a fluid seal with the walls of the cylinder and adapted to be acted upon by fluid under pressure to alternately effect movement of the piston in opposite directions. A dowel pin 29 interconnects the rod 27 and the connecting rod 14 for parallel movement of the latter upon actuation of the piston 13. A slot 30 is provided in each of the tubes 15 and 16 to permit longitudinal movement of the dowel pin upon movement of the piston 13. A similar slot 31 is also provided in the tube 15 to facilitate assembly of the hydraulic unit and also to permit extension of the dowel pin 29 beyond the cylinder 11 if desired.

The fluid sealing members 28 shown in Fig. 1 each comprise a body 32 having a diameter corresponding to the diameter of the cylinder 12 and a sealing cup 33, preferably formed of resilient material, secured to the body by a bolt 34. In operation, the flange portions of the cups 33 are pressed tightly against the walls of the cylinder by the fluid under pressure and thus effect a fluid-tight seal and prevent the fluid from leaking around the body 32 into the central portion of the cylinder 12.

In this modification, it is apparent that each of the sealing cups are enclosed within the housing 10 and that the piston unit has a constant displacement in either direction of movement. The connecting rod 14 may be machined whereby substantially the entire surface area thereof within the cylinder 11 is in bearing contact with the walls of the cylinder and the alignment of the rod may be rigidly maintained, even in the extended position of the unit. The dowel pin 29 maintains the connecting rod 14, as well as the piston rod 27, against rotation within the respective cylinders, thus making the device highly suitable for use with tools and other mechanism which must be held against rotation and permits the use of a connecting rod having less accurate dimensions than was formerly required. Since the damaged portion of the exposed surface of the connecting rod, such as burrs, successively contact only localized areas of the cylinder and since the device does not require a packing around the rod, such damage to the connecting rod is not serious in the device of the present invention.

The modification of the invention shown in Fig. 3 differs from the modification of Figs. 1 and 2 in the provision of an additional fluid sealing unit 28 positioned behind the connecting rod 14 and also the provision of an additional bore 35 in the plate 36. In this modification, the unit has substantially twice the displacement in the outward direction of movement of the connection rod 14 as in the inward movement thereof.

An additional modification of the invention is shown in Figures 4 and 5 in which two pistons 37 are movable in cylinders 38 in the housing 39 and are innerconnected to the connecting rod 14 by a dowel pin 40. The device is provided with a fluid sealing member 41 at the inner end of the connecting rod and thus has additional displacement on the feed or outward stroke of the rod relative to the return stroke thereof.

In this modification, the entire housing 39 is formed integral and is provided with three parallel bores forming the piston cylinders 38 and the connecting rod cylinder 44. The ends of the cylinders are sealed by the plugs 45 having circumferential resilient O rings 46. Each of the plugs 45 are held against displacement within the cylinders by the lock ring 42 seated in an annular groove 43 adjacent the end of each cylinder. A stop 47 is provided on the inner end of each of the plugs 45 to space the piston from the ends of the cylinder 38 and to permit the entry of fluid under pressure behind the piston 37 in the extreme positions thereof.

The housing 39 is provided with four internally threaded fluid inlet ports 48 positioned adjacent the inner ends of the plugs 45 and adapted for connection with any suitable source of fluid under pressure. Additional openings 49 are also provided in the housing to allow fluid pressure communication between the cylinders 38 and the cylinder 44 behind the fluid sealing member 41. The housing is also provided with an elongated slot 50 which permits movement of the dowel pin 40 with the piston 37 relative to the housing 39.

The pistons 37 each comprise a rod 51 and a pair of fluid sealing members 41 having a resilient O ring 53 within a peripheral groove 54 therein. While the fluid sealing members 41 are not attached to the rods 14 or 51, they move as a unit therewith during operation of the fluid pressure unit.

In the modification of the invention illustrated in Figures 6 and 7, a fluid pressure unit is shown in its innermost position having a greater displacement on the return stroke of the connecting rod 14 than on the feed or outward stroke of the rod. The fluid unit comprises a housing 55 having a bore forming the connecting rod cylinder 56 and a piston cylinder including a relatively small bore 57 and a relatively large bore 58. The housing 55 is provided with fluid inlet ports 59 and an elongated slot 60 to permit movement of the dowel 29 with the piston rod. The piston shown in Figure 6 comprises a rod 61 and the fluid sealing member 41 and 62. The rod 61 has a portion 63 extending into and slidable within the relatively small bore 57 and has another enlarged portion 64 slidable within the relatively large bore 58.

The sealing member 62 corresponds to the fluid sealing member 41, except that it is provided with a larger dimension corresponding to the enlarged cylinder 58. Likewise, the plug 65 and the lock ring 66 at the end of the bore 58 corresponds, except in dimensions, to the plug 45 and the lock ring 42 described above.

Each of the modifications illustrated herein embody the novel features of the present invention, which features overcome the many disadvantages of the prior double-acting hydraulic piston construction discussed above and the features produce a hydraulic piston unit having efficiency, durability, and piston displacement flexibility never before attainable in similar devices. By the elimination of the axial connecting rod and the consequent elimination of packing for the rod, the connecting rod may be rigidly maintained in accurate alignment, even in the extended position thereof; the unit may be operated for long periods of time without appreciable wear or deformation of the fluid seals; the fluid seals may be fully enclosed within the cylinder and accordingly protected against any external damage; and any damage to the exposed connecting rod during use is normally not serious since there is no packing which might be cut by the damaged rod. Moreover, scoring of the connecting rod cylinder by a damaged rod, in the device of the present invention, is not appreciably serious since the cylinder walls likely to be scored are not in contact with fluid under pressure.

Having thus described my invention, I claim:

1. A double-acting fluid pressure unit comprising a housing, a pair of parallel cylinders in said housing, said housing having an elongated slot interconnecting said cylinders and also passing through an external wall of the housing, a piston slidable in one of said cylinders and having surface portions adjacent opposite ends thereof forming a fluid seal with said cylinder and adapted to be acted upon by fluid under pressure to alternately effect movement thereof in opposite directions, an integral connecting rod slidable in another of said cylinders, said connecting rod being longer than said piston so that a portion of said connecting rod extends out of said cylinder at all times, and a pin disposed within said elongated slot and connecting said connecting rod to a portion of said piston, which portion is out of contact with fluid under pressure.

2. A double-acting fluid pressure unit comprising a housing, a pair of parallel cylinders in said housing, said housing having an elongated slot interconnecting said cylinders and also passing through an external wall of the housing, a piston slidable in one of said cylinders and having equal surface portions adjacent opposite ends thereof forming a fluid seal with said cylinder and adapted to be acted upon by fluid under pressure to alternately effect movement thereof in opposite directions, an integral connecting rod slidable in the other of said cylinders, said connecting rod being longer than said piston so that a portion of said connecting rod extends out of said cylinder at all times, and a pin disposed within said elongated slot and connecting said connecting rod to a portion of said piston, which portion is out of contact with fluid under pressure.

3. A double-acting fluid pressure unit comprising a housing having a plurality of parallel bores and also having an elongated slot therein extending in the direction of the axes of said bores, said slot interconnecting said bores and passing through an external wall of said housing, a piston slidable in one of said bores and having surface portions adjacent opposite ends thereof forming a fluid seal with the walls of said bore and adapted to be acted upon by fluid under pressure to alternately effect movement thereof in opposite directions, an integral cylindrical connecting rod slidably disposed in another of said bores and having substantially all surface portions thereof which are disposed within said bore in sliding friction contact with the walls of the bore, said connecting rod being longer than said pistons so that a portion of said connecting rod extends out of said cylinder at all times, and a pin disposed within said slot and connecting said connecting rod to a portion of said piston out of contact with the fluid under pressure.

4. A double-acting fluid pressure unit comprising a housing, a pair of parallel cylinders in said housing, said housing having an elongated slot interconnecting said cylinders and also passing through an external wall of the housing, a piston slidable in one of said cylinders and having surface portions adjacent opposite ends thereof forming a fluid seal with said cylinder and adapted to be acted upon by fluid under pressure to alternately effect movement thereof in opposite directions, an integral connecting rod slidable in another of said cylinders, said connecting rod being longer than said piston so that a portion of said connecting rod extends out of said cylinder at all times, a surface portion formed at the enclosed end of said connecting rod to form a fluid seal with the connecting rod cylinder adapted to be acted upon by fluid under pressure to supplement the piston action in one direction, and a pin disposed within said elongated slot and connecting said connecting rod to a portion of said piston, which portion is out of contact with fluid under pressure.

References Cited in the file of this patent

UNITED STATES PATENTS

| Number | Name | Date |
|---|---|---|
| 12,179 | Burgess | Jan. 2, 1855 |
| 559,017 | Worth | Apr. 28, 1896 |
| 882,887 | Hoxie | Mar. 24, 1908 |
| 1,269,195 | McCoy | June 11, 1918 |
| 1,282,482 | Speasl | Oct. 22, 1918 |
| 1,479,075 | Johnson | Jan. 1, 1924 |
| 1,631,629 | Folberth et al. | June 7, 1927 |
| 2,335,252 | Appeman | Nov. 30, 1943 |